Patented Aug. 15, 1950

2,519,327

UNITED STATES PATENT OFFICE 2,519,327

CONDENSATION OF BETA - (4 - METHYL-$\Delta^3$-CYCLOHEXENYL) - BUTYRALDEHYDE WITH ALDEHYDES AND KETONES

Richard B. Wearn and Carl Bordenca, Birmingham, Ala., assignors to Food Machinery and Chemical Corporation, a corporation of Delaware No Drawing. Application January 13, 1947, Serial No. 721,874

8 Claims. (Cl. 260—586)

This invention relates to a class of new aldehyde condensation products and more particularly refers to menthane and menthene aldehyde condensation products with other aldehydes of low molecular weight or methyl ketones.

It is an object of this invention to produce a new class of aldehyde condensation products, particularly those derived from menthane or menthene aldehydes. A further object is to produce a class of aldehydes and ketones which is particularly adapted for use in perfumes and flavoring compositions. Additional objects will become apparent from a consideration of the following description and claims.

We have found that these objects and others may be obtained by the alkaline condensation of menthane aldehydes or menthene aldehydes with aldehydes or methyl ketones. In a more restricted sense we employ as one of the condensation intermediates either a p-menthane aldehyde or a p-menthene aldehyde and for the other condensation intermediate we employ either an aldehyde of low molecular weight, which may be either aliphatic or aromatic, or a methyl ketone. In its preferred embodiment our invention concerns the condensation in the presence of an alkali, of beta-(4-methyl-$\Delta^3$-cyclohexenyl)-butyraldehyde and another aldehyde which should advisably be of low molecular weight, or a methyl ketone. Aldehyde condensation products produced by the alkaline condensation of the foregoing butyraldehyde derivative with either acetone or benzaldehyde appear to be especially well adapted for use in perfume and flavoring compositions, and these constitute two of the preferred embodiments of our invention.

The beta - (4-methyl-$\Delta^3$-cyclohexenyl) - butyraldehyde employed as one of the initial materials is advantageously prepared by reacting limonene with carbon monoxide and hydrogen in the presence of Raney cobalt at a temperature of approximately 130–175° C., and a pressure (at the reaction temperature) of from 1000 to 5000 pounds per square inch for a period of from 0.5 to 10 hours. For example, a yield of about 35% of this unsaturated aldehyde may be obtained by reacting the limonene with carbon monoxide and hydrogen in the presence of Raney cobalt at a temperature of about 150° C. and a pressure at that temperature of about 4330 pounds per square inch for about 3 hours.

The alkaline condensations referred to above should advisably be carried out in the presence of either aqueous-alcoholic alkali or anhydrous alkali alcoholates in alcohol or benzene. Sodium hydroxide and potassium hydroxide, as well as their alcoholates, are quite satisfactory for this purpose.

In order to condense one aldehyde with another in accordance with the present invention, at least one of these aldehydes should have a $CH_2$ group alpha to the formyl group. Condensation between two aldehydes occurs between one of the formyl groups of one aldehyde and the $CH_2$ group alpha to the formyl group of the other aldehyde. In the case of condensation between an aldehyde and a methyl ketone it occurs, for the most part, between the formyl group of the aldehyde and the methyl group adjacent to the CO group of the ketone. By means of this condensation alpha-beta unsaturated aldehydes and ketones may be produced.

Our invention may be more readily understood by a consideration of the following illustrative examples:

Example 1

A mixture of 10.4 grams of beta-(4-methyl-$\Delta^3$-cyclohexenyl)-butyraldehyde, 50 cc. of 1 percent aqueous potassium hydroxide solution, and 100 cc. of methanol was stirred at 5° C. while 3 grams of acetaldehyde dissolved in 10 cc. of methanol was added over a 10 minute period. Stirring was continued for 2 hours at 5° C. and for 2 additional hours at 25° C. The mixture was then poured into water and the oily layer diluted with 1 volume of benzene, washed with 20 percent hydrochloric acid, and distilled. The product, boiling at 107–108° C./3 mm., $n_D^{30}$ 1.484, gave an analysis which indicated it to be a mixture of 5-(4-methyl-$\Delta^3$-cyclohexenyl)-hexen-2-al and the corresponding aldol compound.

Analysis: Calculated for $C_{13}H_{20}O$: C, 81.19%; H, 10.49%. Calculated for $C_{13}H_{22}O_2$: C, 74.24%; H, 10.54%. Found: C, 76.57%; H, 10.37%.

Example 2

A mixture of 360 grams of beta-(4-methyl-$\Delta^3$-cyclohexenyl)-butyraldehyde, 325 grams of acetone, 325 grams of water, and 52 grams of 35 percent sodium hydroxide solution was stirred vigorously at room temperature for 48 hours. Several volumes of water were then added and the oily layer separated, washed successively with 3 percent hydrochloric acid and water, dried over anhydrous calcium sulfate, and distilled. There was obtained 248 grams of beta-(4-methyl-$\Delta^3$-cyclohexenyl)-butyral acetone, B. P. 134° C./7 mm., $n_D^{30}$ 1.492. Analysis of this material showed 80.04 percent carbon and 10.38 percent hydrogen, indicating that a small amount of the aldol compound was present in the product.

In order to obtain entirely pure beta-(4-methyl-$\Delta^3$-cyclohexenyl)-butyral acetone, the above product was treated as follows:

10 grams of the above product was heated at 100° C. with 5 grams of potassium bisulfate for one hour. Distillation gave 7 grams of pure product, B. P. 102–105° C./1–2 mm., $n_D^{30}$ 1.495.

Analysis: Calculated for $C_{14}H_{22}O$: C, 81.50%; H, 10.75%. Found: C, 81.44%; H, 10.39%.

*Example 3*

With external cooling, a solution of 10 grams of beta-(4-methyl-$\Delta^3$-cyclohexenyl)-butyraldehyde in 16 grams of anhydrous methyl isobutyl ketone was dropped slowly into a stirred suspension of 1 gram of sodium methylate in 250 cc. of anhydrous benzene. This addition was completed in 20 minutes, and then stirring was continued for 24 hours at room temperature. The mixture was poured into water, washed with 2 percent hydrochloric acid, and distilled. There was obtained 10 grams of 2-(4-methyl-$\Delta^3$-cyclohexenyl)-8-methyl-nonen-4-one-6, B. P. 125–129° C./3 mm., $n_D^{30}$ 1.487. Analysis of this material indicated that 25 percent of the aldol compound was present:

Analysis: Calculated for $C_{17}H_{28}O$: C, 82.20%; H, 11.35%. Calculated for aldol $C_{17}H_{30}O_2$: C, 76.64%; H, 11.36%. Found: C, 80.76%; H, 10.95%.

*Example 4*

A mixture containing 11.5 grams of beta-(4-methyl-$\Delta^3$-cyclohexenyl)-butyraldehyde, 8 grams of potassium hydroxide dissolved in 30 cc. of water, 15 grams of benzaldehyde, and 50 cc. of methanol was stirred at room temperature for 18 hours. The crude product was then poured into water and the viscous oily layer separated, diluted with 1 volume of benzene, washed successively with 3 percent hydrochloric acid and water, dried over anhydrous calcium sulfate, and distilled. There was obtained 4 grams of alpha-benzal-beta-(4-methyl-$\Delta^3$-cyclohexenyl)-butyraldehyde, B. P. 144–148° C./2 mm., $n_D^{30}$ 1.561. Analysis indicated a small amount of the aldol to be present.

Analysis: Calculated for $C_{18}H_{22}O$: C, 85.00%; H, 8.72%. Found: C, 84.00%; H, 8.86%.

*Example 5*

A suspension of 0.3 gram of sodium methylate in 150 cc. of anhydrous benzene was stirred vigorously at 15° C. while a solution of 5.1 grams of 2-p-menthane aldehyde (preparation described in the U. S. Patent No. 2,510,200, granted March 21, 1950 and 4.5 grams of acetone in 10 cc. of benzene was dropped in over a period of 10 minutes. The temperature was held at 15° C. for 30 minutes, and then allowed to warm up to 25° C. After stirring had been continued for 20 hours, the mixture was poured into water and the benzene layer washed with 5 percent hydrochloric acid, followed by water. Distillation gave 3.5 grams of 2-p-menthanal acetone, B. P. 104° C./2–3 mm., $n_D^{30}$ 1.478.

Analysis: Calculated for $C_{14}H_{24}O$: C, 80.71%; H, 11.61%. Found: C, 79.20%; H, 11.06% (indicating 23 percent of the aldol to be present).

*Example 6*

Five grams of 2-p-menthane aldehyde and 8 grams of methyl isobutyl ketone were added to a suspension of 0.5 gram of sodium methylate in 125 cc. of anhydrous benzene. This mixture was stirred vigorously for 20 hours at 25° C. It was then poured into water and the benzene layer washed with 3 percent hydrochloric acid and distilled. There was obtained 3.5 grams of 1-(2-p-menthyl)-5-methyl-hexen-1-one-3, B. P. 119° C./2–3 mm., $n_D^{30}$ 1.476.

Analysis: Calculated for $C_{17}H_{30}O$: C, 81.53%; H, 12.08%. Found: C, 80.52%; H, 11.78%.

It is to be understood that the above examples are illustrated merely of a few specific embodiments of our invention. They may be varied widely with respect to the individual reactants and the conditions of reaction without departing from the scope hereof.

In place of the butyraldehyde derivative referred to in Examples 1 to 4 or the menthane aldehyde referred to in Examples 5 and 6 it is contemplated that other menthane and menthene aldehydes may be employed. Likewise mixtures of these aldehydes may, if desired, be used in order to vary the odor and flavor of the resulting condensation products. In the case of the 2-p-methane aldehyde it should be noted that it contains no $CH_2$ group alpha to the formyl group, thus it cannot be condensed with another aldehyde having no alpha-$CH_2$ group.

The second condensation intermediate may be either another aldehyde or a methyl ketone. Aldehydes of low molecular weight are preferred and they may be either aliphatic, aromatic, alicyclic or mixed aldehydes. It is also advisable that the methyl ketone be of low molecular weight. The expression "low molecular weight" when used herein is understood to mean a compound containing no more than eight carbon atoms.

For optimum results it is generally advisable to use either acetone or benzaldehyde as the second condensation intermediate.

The products of this invention are suitable for use in many fields. For instance, they may be used as intermediates for the production of other chemical compounds. They are, however, particularly adapted for use in perfume and flavoring compositions, since they have persistent odors which are pleasant to most people and likewise have an agreeable taste.

As many apparently widely different embodiments of this invention may be made without departing from the spirit and scope hereof, it is to be understood that the invention is not limited to the specific embodiments hereof except as defined in the appended claims.

We claim:

1. A process which comprises condensing, in the presence of an alkali, beta-(4-methyl-$\Delta^3$-cyclohexenyl)-butyraldehyde and a member selected from the class consisting of aldehydes and methyl ketones.

2. A process which comprises condensing in the presence of aqueous sodium hydroxide solution, beta-(4-methyl-$\Delta^3$-cyclohexenyl)-butyraldehyde with acetone.

3. A process which comprises condensing, in the presence of aqueous potassium hydroxide solution and methanol, beta-(4-methyl-$\Delta^3$-cyclohexenyl)-butyraldehyde with benzaldehyde.

4. Beta-(4-methyl-$\Delta^3$-cyclohexenyl)-butyral acetone.

5. Alpha-benzal-beta-(4-methyl-$\Delta^3$-cyclohexenyl)-butyraldehyde.

6. Alpha-beta unsaturated aldehydes and ketones obtained by condensation in the presence of an alkali of beta-(4-methyl-$\Delta^3$-cyclohexenyl)- butyraldehyde and with a member selected from the class consisting of aldehydes and methyl ketones.

7. Alpha-beta unsaturated aldehydes obtained by condensation in the presence of an alkali of beta-(4 - methyl-$\Delta^3$-cyclohexenyl)-butyraldehyde with an aldehyde.

8. Alpha-beta unsaturated ketones obtained by condensation in the presence of an alkali of beta-(4-methyl-$\Delta^3$-cyclohexenyl)-butyraldehyde with a methyl ketone.

RICHARD B. WEARN.
CARL BORDENCA.

REFERENCES CITED

The following references are of record in the file of this patent:

UNITED STATES PATENTS

| Number | Name | Date |
|---|---|---|
| 768,389 | Merling et al. | Aug. 23, 1904 |
| 2,327,066 | Roelen | Aug. 17, 1943 |
| 2,373,568 | Joy et al. | Apr. 10, 1945 |
| 2,437,600 | Gresham et al. | Mar. 9, 1948 |

FOREIGN PATENTS

| Number | Country | Date |
|---|---|---|
| 23,254 | Great Britain | of 1898 |
| 121,975 | Germany | July 2, 1901 |
| 394,197 | Great Britain | June 22, 1933 |
| 545,398 | Germany | Mar. 2, 1932 |

OTHER REFERENCES

Rutovskii et al., Chemical Abstracts, vol. 23, page 4942 (1929).